Dec. 27, 1949 W. H. DIETZ 2,492,691
ILLUMINATED WORLD GLOBE
Filed Nov. 25, 1946 2 Sheets-Sheet 1

INVENTOR.
William H. Dietz
BY *Victor J. Evans & Co.*
ATTORNEYS

Dec. 27, 1949  W. H. DIETZ  2,492,691
ILLUMINATED WORLD GLOBE
Filed Nov. 25, 1946  2 Sheets-Sheet 2
Fig. 2
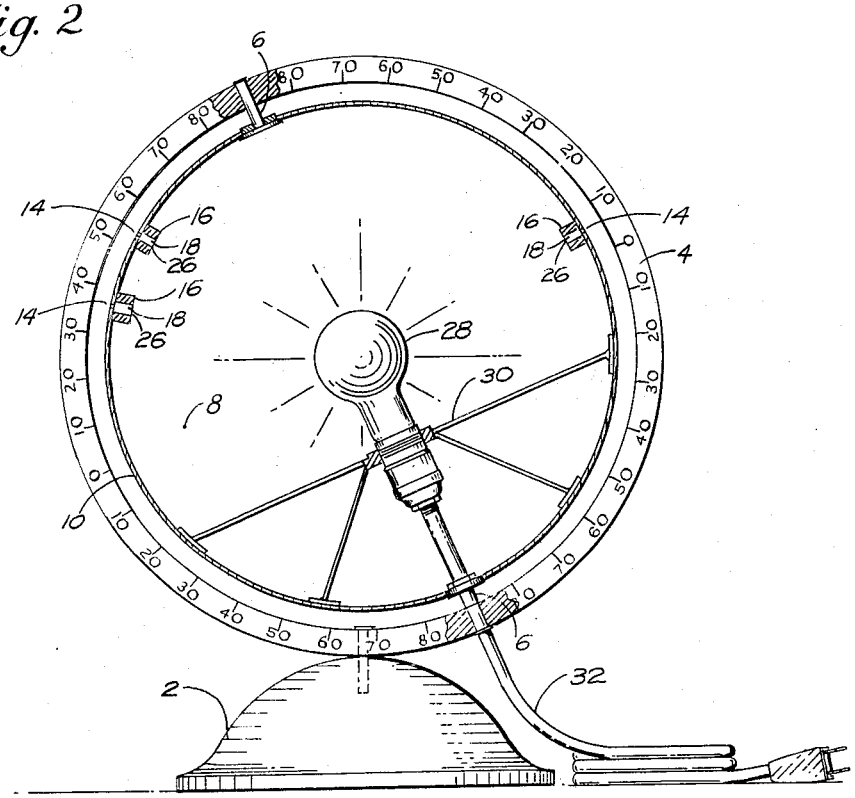
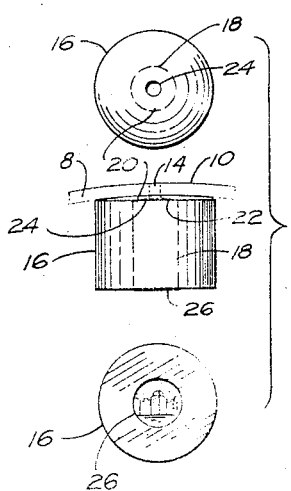
Fig. 6
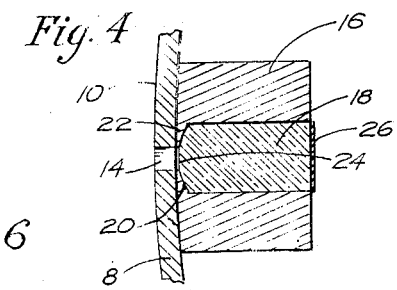
Fig. 4
INVENTOR.
William H. Dietz
BY Victor J. Evans & Co.
ATTORNEYS Patented Dec. 27, 1949

2,492,691

UNITED STATES PATENT OFFICE 2,492,691

ILLUMINATED WORLD GLOBE

William H. Dietz, Pittsburgh, Pa.

Application November 25, 1946, Serial No. 712,207

1 Claim. (Cl. 35—46)

My present invention relates to an improved illuminated world globe and more particularly to the novel and unique structure employed whereby various cities or other interest points on the globe have provided pictorial illustrations in miniature at the geographical location of that point on the globe together with magnifying means so that by peering through a small aperture in the globe at the selected geographical point, the illuminated miniature picture may be clearly seen.

The globe of my invention is both entertaining and educational and being simple in use will prove adaptable to children as well as adults.

In the accompanying drawings I have illustrated one complete example of the physical embodiment of my invention according to the best mode I have thus far devised, but it will be understood that various changes and alterations may be made in the exemplified structure within the scope of the appended claim.

In the drawings:

Fig. 2 is a transverse vertical sectional view.

Fig. 4 is a sectional view through one illustrated point.

Fig. 6 is a series of views of the magnifier structure.

Figure 1:
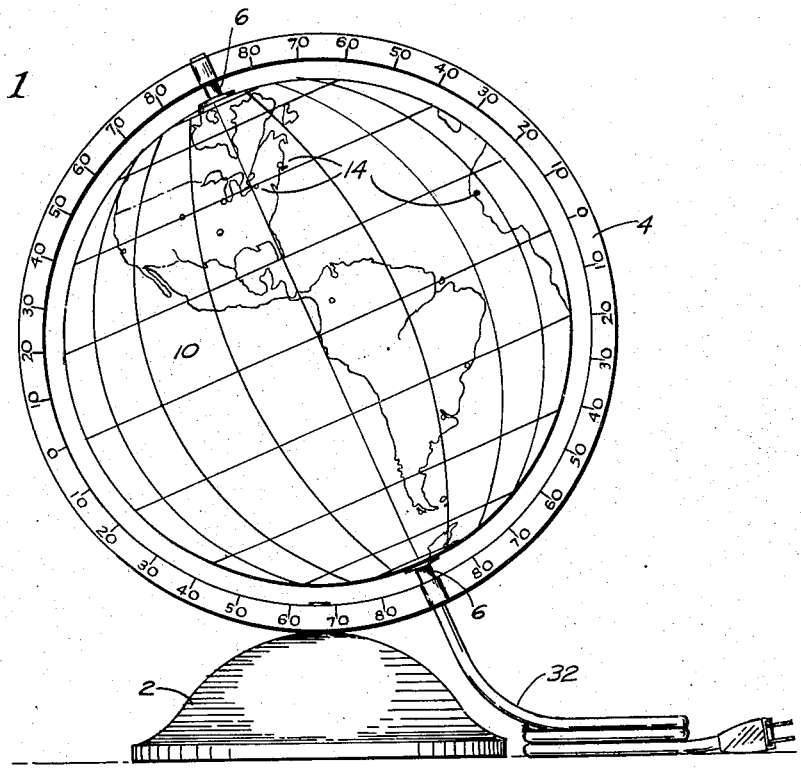
Fig. 1 is an elevational view of the globe of my invention.
Figure 3:
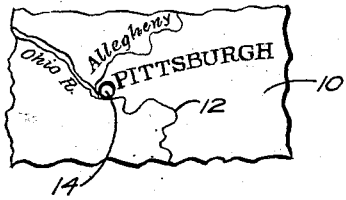
Fig. 3 is an enlarged detail view of a portion of the globe surface.
Figure 5:
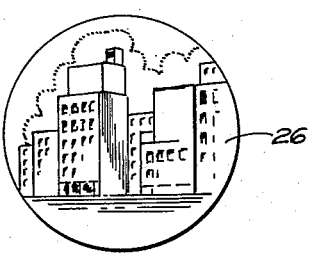
Fig. 5 is a magnified view as seen through one point.

Referring now to the drawings I have illustrated the present preferred embodiment of my invention as comprising the base 2 upon which is supported the meridian ring 4 having diametrically positioned pins 6 for the sphere 8. The sphere is covered with a map 10 of the world and this map includes details such as rivers 12 and cities 14 here shown as apertures in the map and the sphere.

Mounted inside the sphere I use a cylinder 16 having a central passage into which is positioned the magnifying lens 18 having a convex upper surface 20. The flange ring 22 of the cylinder partially covers the convex surface of the lens and the aperture 24 of the ring is aligned with the aperture 14 of the sphere. The inner wall of the ring is concaved to effect a tight fit with the convex lens surface.

On the opposite plane end of the lens I mount a miniature picture 26 of the city geographically shown at 14 and this picture is transparent so that when the viewer peers through the aligned apertures, and the lamp 28 secured in frame 30 and having a cord 32 passing through one pin for electrical connection is illuminated, the transparency will be shown against the rays of light and the picture will be clearly visible.

The sphere may of course be rotated upon the pins 6 to make accessible to the viewer such cities as may be selected to view.

The globe of my invention from the above description will prove of value in according a novel means of associated geographical points of interest with views thereof and it is obvious that such points need not be confined to cities but may well illustrate places or items of general interest.

Having thus fully described my invention what I claim as new and desire to secure by Letters Patent is:

A terrestrial globe comprising the combination of a base, a meridian ring mounted thereon, a hollow spherical member within said ring and having a map of a geographical area inscribed thereon, said map containing representations of geographical points, diametrically opposite means rotatably mounting said spherical member in said meridian ring, said spherical member being pierced by a plurality of apertures, each said aperture coinciding with a geographical point, a magnifying lens axially aligned with each aperture, each lens having a convex and a flat surface with the convex surface adjacent the aperture, a transparency containing a pictorial representation of the geographical point on the map pierced by the respective aperture, said transparency being secured to the flat surface of the lens whereby it may be viewed in magnified form through the respective aperture, a cylindrical member secured internally to said hollow spherical member supporting each said lens and a source of illumination within said spherical member for illuminating the transparencies for viewing through the respective apertures.

WILLIAM H. DIETZ.

REFERENCES CITED

The following references are of record in the file of this patent:

UNITED STATES PATENTS

| Number | Name | Date |
|---|---|---|
| 203,323 | Closson | May 7, 1878 |
| 1,306,203 | Tippit | June 10, 1919 |
| 2,175,239 | Amdur | Oct. 10, 1939 |
| 2,182,334 | Crespo | Dec. 5, 1939 |
| 2,355,304 | Koch | Aug. 8, 1944 |